United States Patent [19]
Jansen

[11] Patent Number: 5,835,360
[45] Date of Patent: Nov. 10, 1998

[54] REGULATION OF SECOND OUTPUT OF A SWITCHED MODE POWER SUPPLY

[75] Inventor: Arian Jansen, Crolles, France

[73] Assignee: Hewlett-Packard Company, Palo Alto, Calif.

[21] Appl. No.: 675,303

[22] Filed: Jul. 1, 1996

[30] Foreign Application Priority Data

Jul. 31, 1995 [EP] European Pat. Off. ............. 95410077

[51] Int. Cl.⁶ ...................................................... G05F 1/577
[52] U.S. Cl. .............................................................. 363/21
[58] Field of Search .................................. 323/267–282, 323/290; 313/351; 363/20–21

[56] References Cited

U.S. PATENT DOCUMENTS 5,119,013  6/1992  Sabroff ..................................... 323/267

FOREIGN PATENT DOCUMENTS

A0420074  11/1991  European Pat. Off. .
A04752963  3/1992  European Pat. Off. .

OTHER PUBLICATIONS

IBM Technical Disclosure Bulletin, vol. 37, No. 10, 1 Oct. 1994 pp. 175/176 XP 000475621.
"Multiple–Output Bulk Converter".

*Primary Examiner*—Aditya Krishnan

[57] ABSTRACT

A switched mode power supply is provided that has two output circuits one of which is directly regulated by control of the input switching device and the other of which is indirectly regulated. This indirect regulation is provided by means of an additional winding wound in common on an energy-storing magnetic core with windings of the first and second output circuits. The additional winding is connected between a lower-voltage one of the output circuits and the other, higher-voltage, output circuit such that when the lower-voltage output circuit is lightly loaded current can flow from this output circuit through the additional winding to the higher-voltage output circuit, this current decreasing as the loading on the lower-voltage output circuit increases.

6 Claims, 3 Drawing Sheets

REGULATION OF SECOND OUTPUT OF A SWITCHED MODE POWER SUPPLY

FIELD OF THE INVENTION

The present invention relates to a switched mode power supply having two output circuits one of which is directly regulated by control of the input switching device and the other of which is indirectly regulated.

BACKGROUND OF THE INVENTION

It is known in the art to provide a switched mode power supply with multiple outputs and FIG. 1 shows such a supply in the form of a forward converter 10 with two outputs 11, 12. As is well known, by adjusting the duty cycle of the switching device 14, it is possible to vary the output voltage of a forward converter; however, where there are multiple outputs, output voltage regulation can only be effected for one such output. In the FIG. 1 supply, output 11 has its voltage regulated by having its output voltage feedback to control circuit 15 (the output voltage is not directly connected to the control circuit 15 in order to preserve isolation; instead a measure of this voltage is fedback and this is the significance of the dotted oval around the output of circuit 11).

If the regulation of the other outputs is needed, then additional regulation stages are generally used. To avoid the need for this, it is known to wind the output inductors 16 and 17 on a common core, so that a change in the unregulated output 12 is coupled to the regulated output. Such an arrangement is only partially effective and can give rise to stability problems.

It is also known to integrate more directly the multiple outputs by serially interconnecting their driving inductors. Such an arrangement is shown in FIG. 2 for a flyback converter 20 with two secondary windings providing two outputs 21, 22. In this case, the output 21 is provided by serial interconnection of the two secondary windings whilst output 22 uses only one of the secondary windings. A disadvantage of such an arrangement is that output 21 always draws all its current through diodes D1 and D2 which reduces the efficiency of the power supply.

It is an object of the present invention to provide a switched mode power supply having an improved arrangement for indirect regulation of a second output.

SUMMARY OF THE INVENTION

According to one aspect of the present invention, there is provided a switched mode power supply having:

input circuitry including a switching device for chopping the input power, a first output circuit for supplying a first output voltage between a first line output and a common line, the first output circuit receiving power from the input circuitry and including a first winding wound on an energy-storing magnetic core, a control circuit for controlling operation of the switching device in response to the level of the first output voltage whereby to maintain the first output voltage substantially constant, a second output circuit for supplying a second output voltage, less than the first output voltage, between a second line output and the common line, the second output circuit including a second winding which is also wound on said magnetic core and through which the second output circuit receives its power, the voltages induced in the first and second windings during magnetic field collapse in the magnetic core determining the relative magnitudes of the first and second output voltages, and a third winding also wound on the magnetic core and connected in series with a diode between the first and second line outputs, the voltage induced in the third winding during magnetic field collapse in the magnetic core being additive to the second output voltage and being of a magnitude such that when the second output circuit is lightly loaded current can flow from the second output circuit through the third winding to the first output circuit, this current decreasing as the loading on the second output circuit increases.

With this arrangement, loading of the second output circuit has a direct effect on the first output circuit in a manner such that the regulation provided by the control circuit benefits the stability of the second output voltage. Furthermore, power loss in the diode associated with the third winding decreases with loading of the second circuit which provides increased efficiency over the prior art circuit described above with reference to FIG. 2.

Advantageously, the first output circuit is configured as a buck regulator and the second output circuit is configured as a flyback converter for which the first and second windings respectively form primary and secondary windings of an energy-storing transformer.

It may also be noted that the first output circuit serves to clamp upward movement of the second output voltage which may tend to occur as a result of leakage inductance effects which manifest themselves when the second output is lightly loaded.

Other configurations of the output circuits are also possible. Thus, both the first and second output circuits can be in a flyback converter configuration, the first and second windings forming respective secondaries of an energy-storing transformer whose primary forms part of the input circuitry.

In another arrangement, the first output circuit is in a forward converter configuration and the second output circuit is configured as a flyback converter for which the first and second windings respectively form primary and secondary windings of an energy-storing transformer.

Further output circuits may also be provided having indirect regulation in the same manner as the second output circuit.

According to another aspect of the present invention, there is provided a switched mode power supply having two outputs with a common line, the power supply comprising:

a buck regulator for providing a first output voltage to a first one of said outputs and including a switching device, a control circuit for controlling operation of the switching device in response to the level of the first output voltage whereby to maintain the first output voltage substantially constant, and an energy-storing inductive component with a first winding wound on a magnetic core, a flyback converter for providing a second output voltage, less than the first output voltage, to a second one of said outputs, the flyback converter making use of the same switching device as the buck regulator and including an energy-storing transformer formed by said first winding of the buck regulator acting as a primary winding for the transformer and a second winding wound on said magnetic core and acting as a secondary winding of the transformer, and a third winding also wound on said magnetic, core and connected in series with a diode between the first and second outputs, the voltage induced in the third winding during magnetic field collapse in said magnetic core being additive to the second output voltage and being of a magnitude such that when the second output is lightly loaded current can flow from the flyback converter through the third winding to the buck regulator, this current decreasing to zero as the loading on the second output increases.

BRIEF DESCRIPTION OF THE DRAWINGS

Three forms of switched mode power supply embodying the invention will now be described, by way of non-limiting example, with reference to the accompanying diagrammatic drawings, in which.

BEST MODE OF CARRYING OUT THE INVENTION

Figure 1:
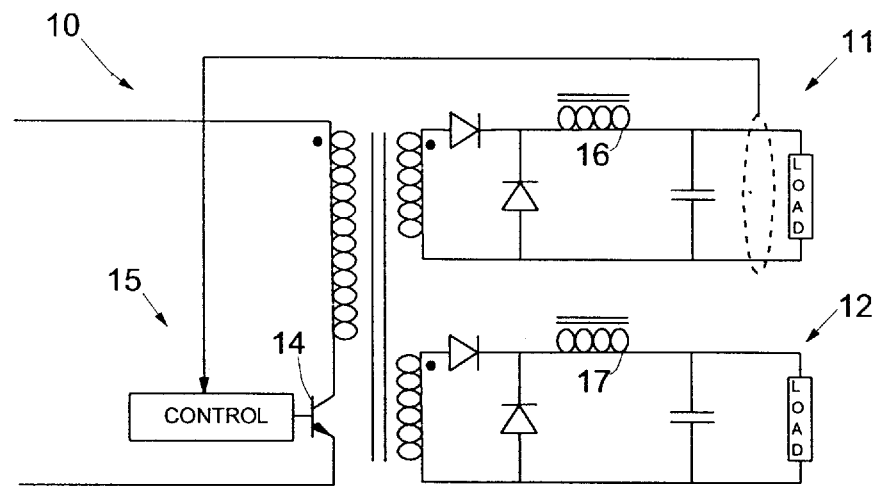
FIG. 1 is a circuit diagram of a known switched mode power supply in the form of a forward converter with two output circuits, the energy-storing inductive components of the two output circuits being commonly wound.
Figure 2:
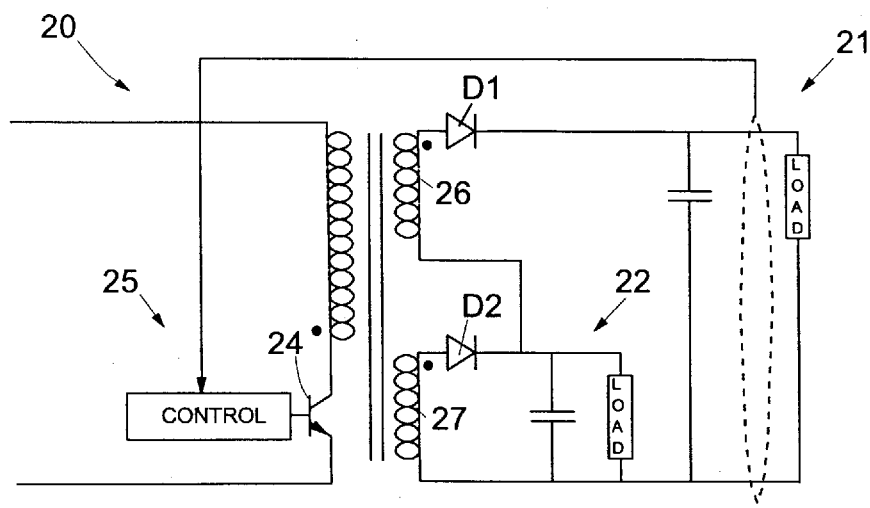
FIG. 2 is a circuit diagram of another known switched mode power supply in the form of a flyback converter with two output circuits, the energy-storing transformer of the converter having two secondary windings and one of the output circuits providing a higher-voltage output by serially inter-connection of the two secondary windings.
Figure 3:
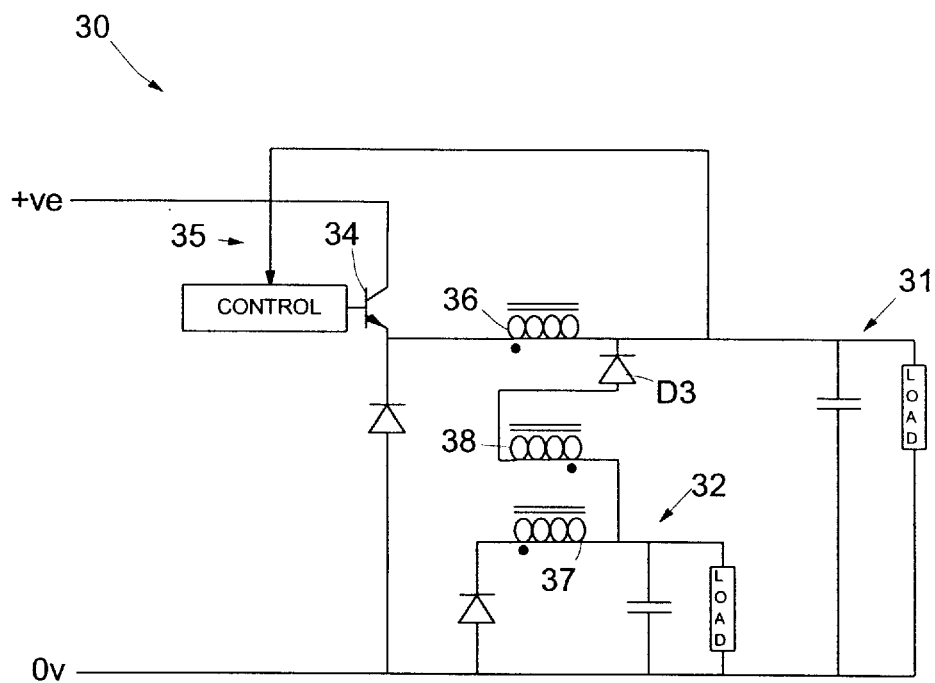
FIG. 3 is a circuit diagram of a first switched mode power supply embodying the invention, this switched mode power supply having two output circuits respectively configured as a buck regulator and a flyback converter.

In the first embodiment of the invention shown in FIG. 3, a switched mode power supply has a first output circuit 31 configured as a buck regulator with the input power being chopped by a switching device 34 and fed to an inductive component having a winding 36 wound on an energy-storing magnetic core. Buck regulators are well known in the art and operation of output circuit 31 will therefore not be described in detail. The output circuit 31 has its output voltage regulated by feedback from its line output to a control circuit 35 that serves to adjust the duty cycle of the switching device such as to keep the output voltage of circuit 31 substantially constant.

A second output circuit 32 is formed as a flyback converter by having a winding 37 jointly wound with winding 36 on the same energy-storing magnetic core. The winding 36 acts as a transformer primary winding and winding 37 acts as a transformer secondary winding to form the energy-storing transformer of the flyback converter. Again, flyback converters are well known in the art and operation of output circuit 32 will not be described in detail.

The first and second output circuits 31, 32 have a common zero volts output line.

The output voltage of the second output circuit 32 is dependent on the output voltage chosen for the first output circuit 31, this dependency being due to the inductive coupling of windings 36 and 37. In general terms, since the output voltages of circuits 31 and 32 correspond to the voltages induced in windings 36 and 37 respectively during collapse of the magnetic field in the common core, the ratio of the output voltages of circuits 31 and 32 will correspond to the turns ratio of windings 36 ad 37 (this is not fully accurate due mainly to the diode voltage drops in the circuits). In the FIG. 3 power supply, the output voltage of the second output circuit 32 is less than the output voltage of output circuit 31.

To provide a degree of regulation of the second output circuit 32 in dependence on its loading (rather than the loading of output circuit 31), a third winding 38 is jointly wound with windings 36 ad 37 on the same magnetic core. This third winding 38 is connected through diode D3 from the line output for circuit 32 to the line output for circuit 31.

The sense of connection of the winding 38 is such that the voltage induced in the winding 38 during collapse of the magnetic field in the common core, is additive to the output voltage of the second output circuit 32. Furthermore, the magnitude of this induced voltage is set (by appropriate selection of the number of turns of winding 38 relative to the number of turns of windings 36, 37) such that when the second output circuit is lightly loaded by its load, a current can flow from circuit 32, through winding 38 and diode D3, to the line output of circuit 31. However, as the loading of the circuit 32 by its own load is increased, the voltage losses in the circuit 32 reduces the current flow through winding 38 to zero. The effect of this is that the first output circuit 31 is rendered sensitive to the loading of the second output circuit-increased loading of the second output circuit 32 resulting in a drop in the output voltage of circuit 31 which is duly corrected for by the control circuit 35 increasing the duty cycle of the switching device 34. This of course has the effect of increasing not only the voltage induced in winding 36 during magnetice field collapse, but also the voltage induced in winding 37 whereby to compensate for internal circuit losses produced by the increased loading. It will also be noted that on initial load increase in circuit 32, the diversion of current from winding 38 (assuming circuit 31 is drawing current) to the load of circuit 32 has a significant compensatory effect.

Another advantageous effect present in the FIG. 3 embodiment is that the first output circuit 31 serves to clamp upward movement of the second output voltage which may tend to occur, when the second output is lightly loaded, due to leakage inductance causing a voltage spike in winding 37 on turn off of the switching device 34.

Figure 4:
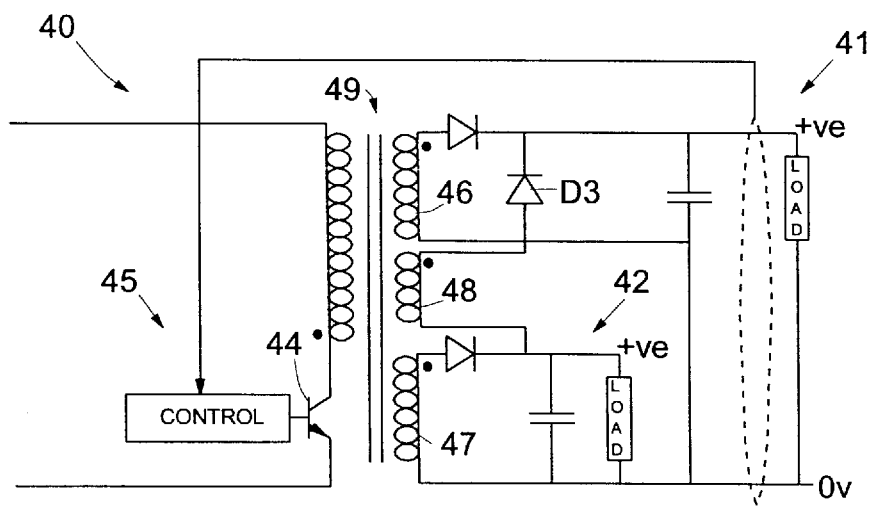
FIG. 4 is a circuit diagram of a second switched mode power supply embodying the invention, this switched mode power supply having two output circuits both in a flyback converter configuration.

FIG. 4 shows a second embodiment of the present invention. In this case, a flyback converter is provided having two output circuits 41 and 42. A transformer 49 of the flyback converter has an energy-storing magnetic core. A primary winding of the transformer is connected in series with a switching device 44. A first secondary winding 46 supplies the first output circuit 41 the output voltage of which is regulated by the feedback of this voltage to a control circuit 45 that controls the duty cycle of the switching device 44.

A second secondary winding of the transformer 49 supplies the second output circuit 42 which is of similar form to circuit 41 but without any feedback regulation. The voltage output of the second output circuit 42 is less than the voltage output of the first output circuit 41.

As with the FIG. 3 power supply, indirect regulation of the second output circuit 42 is provided by means of a winding 48 wound on the same core as windings 46 and 47 and connected in series between the line outputs of output circuits 42 and 41 through a diode D3.

The connection sense of winding 48 and its number of turns are both determined according to the criteria discussed above with reference to the FIG. 3 embodiment, the objective again being to enable a current to flow from the second output circuit 42 to the regulated first output circuit in light load conditions of the second output circuit. The indirect regulation of circuit 42 by this arrangement operates in the same manner as for the FIG. 3 power supply.

Figure 5:
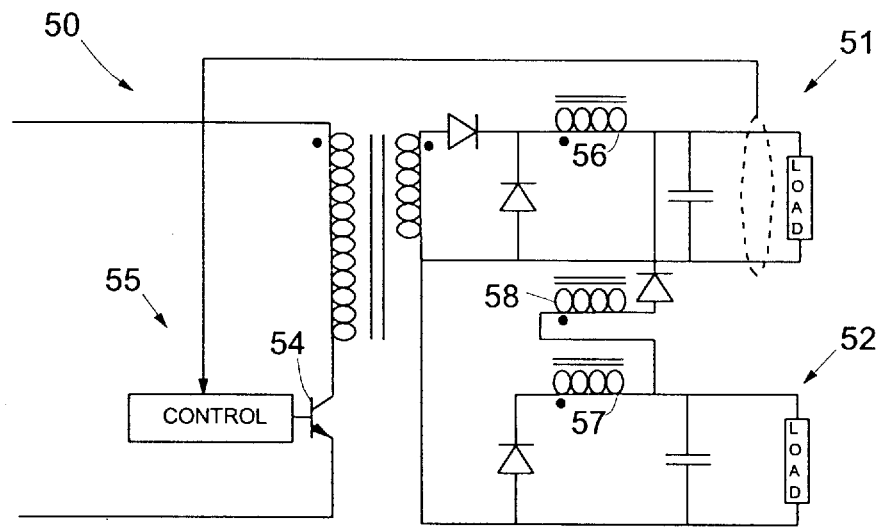
FIG. 5 is a circuit diagram of a third switched mode power supply embodying the invention, this switched mode power supply having two output circuits respectively configured as a forward converter and a flyback converter.

FIG. 5 shows a third embodiment of the invention in which a switched mode power supply 50 is provided with a switching device 54 and a first output circuit 51 configured as a forward converter. The first output circuit 51 has a winding 56 wound on an energy-storing magnetic core. The output voltage of the first output circuit is directly regulated by feeding back this voltage to a control circuit 55 that adjusts the duty cycle of the switching device 54 appropriately.

A second output circuit 52 is provided as a flyback converter with a winding 57 wound on the same core as winding 56. The windings 56 ad 57 respectively form the primary and secondary of an energy-storing transformer.

As with the embodiments of FIGS. 3 and 4, a further winding 58 is jointly wound with windings 56 ad 57 and is connected between the line output of the second and first output circuits 52 and 51 through a diode D3. The arrangement and functioning of this further winding 58 is analogous to that of windings 38 ad 48 in FIGS. 3 ad 4 and will therefore not be described in detail.

Figure 6:
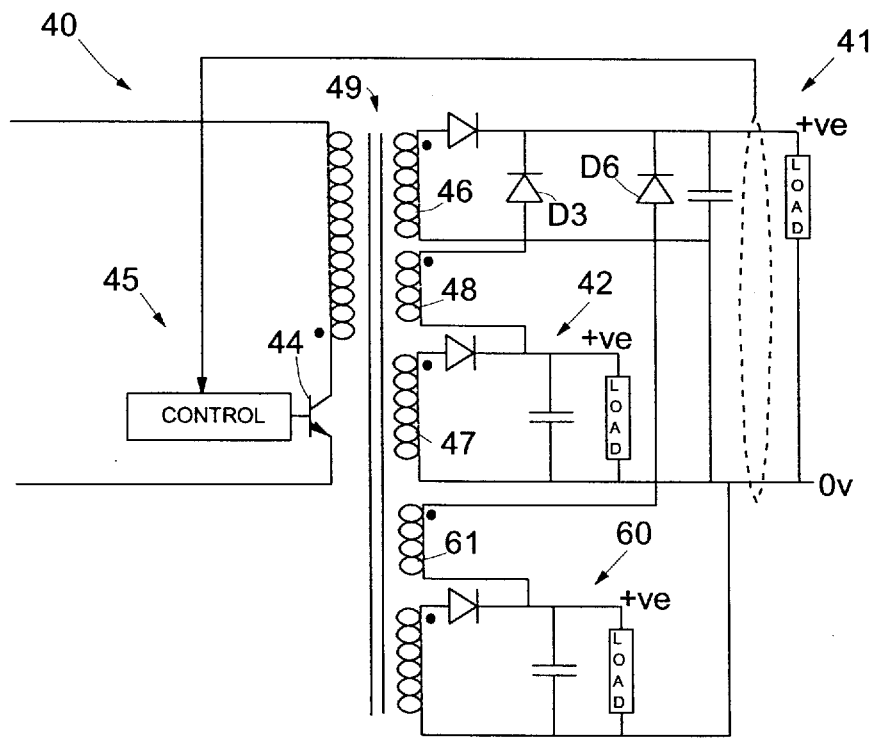
FIG. 6 is a circuit diagram of a fourth switched mode power supply embodying the invention, this embodiment being similar to that of FIG. 4 but with a third output circuit.

Various modifications are, of course, possible to the above-described embodiments of the invention. For example, three or more output circuits could be provided with each lower voltage one being connected through a respective additional winding and diode to the higher-voltage output circuit. FIG. 6 shows such an arrangement for a switched mode power supply similar to that shown in FIG. 4; in this case a third output circuit 60 is connected through a winding 61 and diode D6 to the output line of the first output circuit 41, the winding 61 being wound on the core of transformer 49.

I claim:

1. A switched mode power supply having:
    input circuitry including a switching device for chopping the input power,
    a first output circuit for supplying a first output voltage between a first line output and a common line, the first output circuit receiving power from the input circuitry and including a first winding wound on an energy-storing magnetic core,
    a control circuit for controlling operation of the switching device in response to the level of the first output voltage whereby to maintain the first output voltage substantially constant,
    a second output circuit for supplying a second output voltage, less than said first output voltage, between a second line output and said common line, the second output circuit including a second winding which is also wound on said magnetic core and through which the second output circuit receives its power, the voltages induced in said first and second windings during magnetic field collapse in said magentic core determining the relative magnitudes of said first and second output voltages, and
    a third winding also wound on said magnetic core and connected in series with a diode between said first and second line outputs, the voltage induced in the third winding during magnetic field collapse in said magnetic core being additive to said second output voltage and being of a magnitude such that when the second output circuit is lightly loaded current can flow from the second output circuit through the third winding to the first output circuit, this current decreasing as the loading on the second output circuit increases.

2. A switched mode power supply according to claim 1, wherein said first output circuit is configured as a buck regulator and said second output circuit is configured as a flyback converter for which said first and second windings respectively form primary and secondary windings of an energy-storing transformer.

3. A switched mode power supply according to claim 1, wherein said first and second output circuits are both configured as flyback converters.

4. A switched mode power supply according to claim 1, wherein said first output circuit is configured as a forward converter and said second output circuit is configured as a flyback converter for which said first and second windings respectively form primary and secondary windings of an energy-storing transformer.

5. A switched mode power supply according to claim 1, further comprising:
    a third output circuit for supplying a third output voltage, less than said first output voltage, between a third line output and said common line, the third output circuit including a fourth winding which is also wound on said magnetic core and through which the third output circuit receives its power, the voltages induced in said first and fourth windings during magnetic field collapse in said magnetic core determining the relative magnitudes of said first and third output voltages, and
    a fifth winding also wound on said magnetic core and connected in series with a diode between said first and third line outputs, the voltage induced in the fifth winding during magnetic field collapse in said magnetic core being additive to said third output voltage and being of a magnitude such that when the third output circuit is lightly loaded current can flow from the third output circuit through the fifth winding to the first output circuit, this current decreasing as the loading on the third output circuit increases.

6. A switched mode power supply having two outputs with a common line, the power supply comprising:
    a buck regulator for providing a first output voltage to a first one of said outputs and including a switching device, a control circuit for controlling operation of the switching device in response to the level of the first output voltage whereby to maintain the first output voltage substantially constant, and an energy-storing inductive component with a first winding wound on a magnetic core,
    a flyback converter for providing a second output voltage, less than said first output voltage, to a second one of said outputs, the flyback converter making use of the same switching device as the buck regulator and including an energy-storing transformer formed by said first winding of the buck regulator acting as a primary winding for the transformer and a second winding wound on said magnetic core and acting as a secondary winding of the transformer, and a third winding also wound on said magnetic core and connected in series with a diode between said first and second outputs, the voltage induced in the third winding during magnetic field collapse in said magnetic core being additive to said second output voltage and being of a magnitude such that when the second output is lightly loaded current can flow from the flyback converter through the third winding to the buck regulator, this current decreasing to zero as the loading on the second output increases.

* * * * *